United States Patent
Kanda et al.

(10) Patent No.: US 6,997,831 B2
(45) Date of Patent: Feb. 14, 2006

(54) VEHICULAR TRANSMISSION

(75) Inventors: Tomoyuki Kanda, Wako (JP); Takao Sato, Wako (JP); Yoshimichi Tsubata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 247 days.

(21) Appl. No.: 10/680,003

(22) Filed: Oct. 7, 2003

(65) Prior Publication Data

US 2004/0077444 A1    Apr. 22, 2004

(30) Foreign Application Priority Data

Oct. 22, 2002 (JP) .............................. 2002-307285

(51) Int. Cl.
*F16H 37/02* (2006.01)
*B60K 41/22* (2006.01)

(52) U.S. Cl. .......................... 474/8; 74/664; 192/3.63; 475/210; 477/41; 477/44; 477/116

(58) Field of Classification Search ................ 475/210, 475/209; 192/3.63, 3.58; 474/8, 72; 477/39, 477/41, 44, 45, 116, 143; 74/664
See application file for complete search history.

(56) References Cited

U.S. PATENT DOCUMENTS

| | | | | |
|---|---|---|---|---|
| 4,458,558 A | * | 7/1984 | Frank ........................... | 474/72 |
| 5,207,617 A | * | 5/1993 | Kato et al. ..................... | 477/41 |
| 5,655,993 A | * | 8/1997 | Fujimoto et al. ........... | 477/116 |
| 6,383,114 B1 | * | 5/2002 | Hoshiya et al. ................ | 477/2 |
| 6,767,309 B1 | * | 7/2004 | Fujimoto et al. ............. | 477/44 |

FOREIGN PATENT DOCUMENTS

| | | |
|---|---|---|
| JP | 63-14228 | 8/1981 |
| JP | 2002048213 A | 2/2002 |

* cited by examiner

*Primary Examiner*—Rodney H. Bonck
(74) *Attorney, Agent, or Firm*—Fish & Richardson P.C.

(57) ABSTRACT

A transmission equipped with a continuously variable ratio-change mechanism CVT and a LOW rotational transmission mechanism GT, which are disposed parallel with each other, comprises a forward clutch 65 and a reverse brake 66, which are used to set a power transmission through the continuously variable ratio-change mechanism, a LOW clutch 46, which is used to set a power transmission through the LOW rotational transmission mechanism, and a control unit ECU and a hydraulic control valve HV, which control the engagement of the clutches and the brake. When the transmission is switched from its neutral mode to its in-gear mode, at first, the forward clutch 65 is brought gradually into engagement, and then it is released before the LOW clutch 46 is brought into engagement in a squat control.

4 Claims, 7 Drawing Sheets

Fig. 7

|  |  | LOW (46) | FWD (65) | REV (66) | DV (33a) | DN (38a) |
|---|---|---|---|---|---|---|
| Forward | Start-up | ○ | △ |  | ○ | ○ |
| Forward | Drive |  | ○ |  | ○ | ○ |
| Rearward Start-up & Drive |  |  |  | ○ | ○ | ○ |
| Neutral |  |  |  |  | ○ | ○ |

VEHICULAR TRANSMISSION

FIELD OF THE INVENTION

The present invention relates to a transmission equipped with a continuously variable ratio-change mechanism and a fixed ratio rotational transmission mechanism, which are disposed in parallel with each other between the input shaft and the output shaft of the transmission.

BACKGROUND OF THE INVENTION

Such a vehicular transmission, which comprises a continuously variable ratio-change mechanism and a fixed ratio rotational transmission mechanism (a rotational transmission mechanism comprising a gear train) arranged in parallel with each other, has been known (for example, refer to Japanese Patent Publication No. S63(1988)-14228 and to Japanese Laid-Open Patent Publication No. 2002-48213). For example, Japanese Patent Publication No. S63(1988)-14228 discloses a transmission that comprises a belt-type continuously variable ratio-change mechanism and a reduction gear train (a gear-type rotational transmission mechanism or a fixed ratio rotational transmission mechanism), which are disposed in parallel with each other between the input shaft and the output shaft of the transmission, the input shaft being connected to a torque converter that receives the output of an engine. In this transmission, the input shaft is provided with a first hydraulic clutch, which is used for transmitting power to the reduction gear train, and with a second hydraulic clutch, which is used for transmitting power to the belt-type continuously variable ratio-change mechanism, and the output shaft is provided with a forward/reverse-switching planetary gear train and a starting clutch (main clutch). Also, Japanese Laid-Open Patent Publication No. 2002-48213 discloses a similar transmission (refer to FIG. 1 and FIG. 2).

In such a transmission, typically, the speed change ratio of the reduction gear train is set for a speed lower than a speed at the lowest speed change ratio of the belt-type continuously variable ratio-change mechanism. When the vehicle is started, the first hydraulic clutch is engaged to transmit the rotational driving force of the engine through the reduction gear train to the drive wheels of the vehicle. After the vehicle is started, the first hydraulic clutch is released, and instead, the second hydraulic clutch is engaged to transmit the power through the belt-type continuously variable ratio-change mechanism. Thereafter, a continuously variable speed change is performed for the vehicle to travel smoothly.

Japanese Laid-Open Patent Publication No. 2002-48213 discloses a transmission whose reduction gear train comprises a low-speed gear train and a high-speed gear train, which are disposed in parallel with each other, as shown in FIG. 3. In this case, also, the speed change ratio of the low-speed gear train is set at a ratio for a speed lower than that at the lowest speed change ratio of the continuously variable ratio-change mechanism, and the speed change ratio of the high-speed gear train is set at a ratio for a speed higher than that at the highest speed change ratio of the continuously variable ratio-change mechanism. This transmission transmits the power through the low-speed gear train at the starting of the vehicle, and then it is switched to the power transmission through the continuously variable ratio-change mechanism. Thereafter, when the speed change ratio of the transmission reaches the highest speed change ratio of the continuously variable ratio-change mechanism, the operation of the transmission is switched to the power transmission through the high-speed gear train.

In the above described transmission, the low-speed gear train establishes the lowest speed change ratio of the transmission to transmit a large torque necessary for starting and accelerating the vehicle from a halt condition. In such a transmission, there is a problem of shock that may be caused from a large torque acting on the drive wheels when the transmission is shifted from its neutral mode to its in-gear mode with the first hydraulic clutch coming into engagement to transmit the rotational driving force of the engine to the drive wheels (i.e., when a so-called "in-gear" operation is implemented). Especially, when the temperature of the oil used to actuate the hydraulic clutch is low, the engaging action of the hydraulic clutch is likely to become abrupt, so the above mentioned shock becomes serious. This problem impairs the user's driving experience or the comfort of the vehicle.

SUMMARY OF THE INVENTION

It is an object of the present invention to provide a vehicular transmission that comprises a continuously variable ratio-change mechanism and a fixed ratio rotational transmission mechanism and that performs a smooth in-gear operation without any shock, the in-gear operation of the transmission being executed from a neutral mode of the transmission.

A vehicular transmission according to the present invention comprises a continuously variable ratio-change mechanism (for example, the belt-type continuously variable ratio-change mechanism CVT described in the following embodiment) and a fixed ratio rotational transmission mechanism (for example, the LOW rotational transmission mechanism GT described in the following embodiment), which are disposed parallel with each other for transmitting a rotational driving force input from a drive source to wheels. The transmission further comprises first frictionally engaging means (for example, the forward clutch 65 and the reverse brake 66 described in the following embodiment), second frictionally engaging means (for example, the LOW clutch 46 described in the following embodiment) and engagement-controlling means (for example, the control unit ECU and the hydraulic control valve HV described in the following embodiment). The first frictionally engaging means is provided in the continuously variable ratio-change mechanism for setting a power transmission through the continuously variable ratio-change mechanism, the second frictionally engaging means is provided in the fixed ratio rotational transmission mechanism for setting a power transmission through the fixed ratio rotational transmission mechanism, and the engagement-controlling means controls the engagement of the first and second frictionally engaging means. With this arrangement, when the transmission is switched from its neutral mode where both the first and second frictionally engaging means are released to its in-gear mode where the rotational driving force of the drive source is transmitted to the wheels for driving the wheels (i.e., when an in-gear operation is implemented), the engagement-controlling means, at first, brings into engagement one of the first and second frictionally engaging means that sets a power transmission through one of the continuously variable ratio-change mechanism and the fixed ratio rotational transmission mechanism whose speed change ratio is set for a higher speed. The engagement-controlling means, then, releases this one of the first and second frictionally engaging means and brings the other one of the first and second frictionally engaging means into engagement (this operation is a so-called squat control).

In this vehicular transmission, during the in-gear operation, at first, one of the first and second frictionally engaging means is brought into engagement to set a power transmission through the mechanism whose speed change ratio is for a higher speed. In this instance, the wheels receive a relatively small torque, which is transmitted at a speed change ratio used for a high speed. Then, this one of the frictionally engaging means is released, and the other of the first and second frictionally engaging means is brought into engagement to set a power transmission through the mechanism whose speed change ratio is for a lower speed. In this condition, a relatively large torque is transmitted in correspondence to this speed change ratio used for a lower speed. In other words, during the in-gear operation, the wheels receive, at first, a small torque, and then, a large torque to achieve a smooth in-gear operation without any shock.

In this vehicular transmission, it is preferable that the speed change ratio of the fixed ratio rotational transmission mechanism be set at a ratio for a speed lower than that at the lowest speed change ratio of the continuously variable ratio-change mechanism. With this arrangement, when the transmission is switched from its neutral mode, where both the first and second frictionally engaging means are released, to its in-gear mode, where the rotational driving force of the drive source is transmitted to the wheels for driving the wheels (i.e., when an in-gear operation is implemented), the engagement-controlling means preferably performs a squat control by engaging the first frictionally engaging means at first, and then, by releasing the first frictionally engaging means and engaging the second frictionally engaging means. In this case, it is preferable that the first frictionally engaging means be controlled to come into engagement while the speed change ratio of the continuously variable ratio-change mechanism is set at a predetermined ratio that is effective for preventing occurrence of in-gear shock (this ratio is determined in correspondence to the characteristics of the vehicle, the temperature of the hydraulic oil and the like).

On the other hand, the speed change ratio of the fixed ratio rotational transmission mechanism may be set at a ratio for a speed higher than that at the highest speed change ratio of the continuously variable ratio-change mechanism. In this case, when the transmission is switched from its neutral mode, where both the first and second frictionally engaging means are released, to its in-gear mode, where the rotational driving force of the drive source is transmitted to the wheels for driving the wheels (when an in-gear operation is implemented), the engagement-controlling means performs a squat control by engaging the second frictionally engaging means momentarily, releasing this second frictionally engaging means, and then, engaging the first frictionally engaging means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 7 is a table describing control contents which are executed by the control system.

DESCRIPTION OF THE PREFERRED EMBODIMENTS

Figure 1:
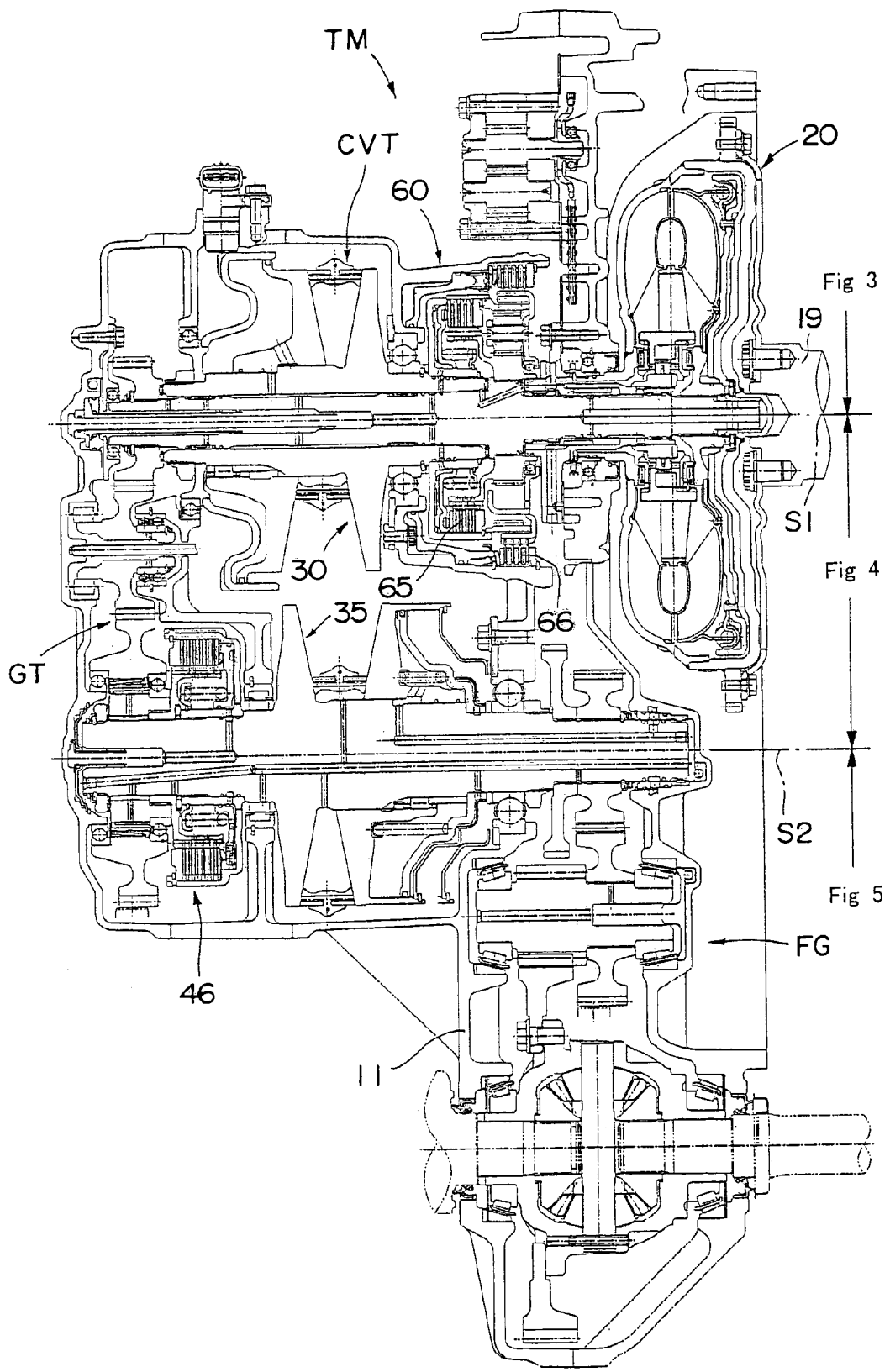
FIG. 1 is a sectional view of a vehicular transmission as a preferred embodiment according to the present invention, showing the whole construction of the internal power transmission mechanism.
Figure 2:
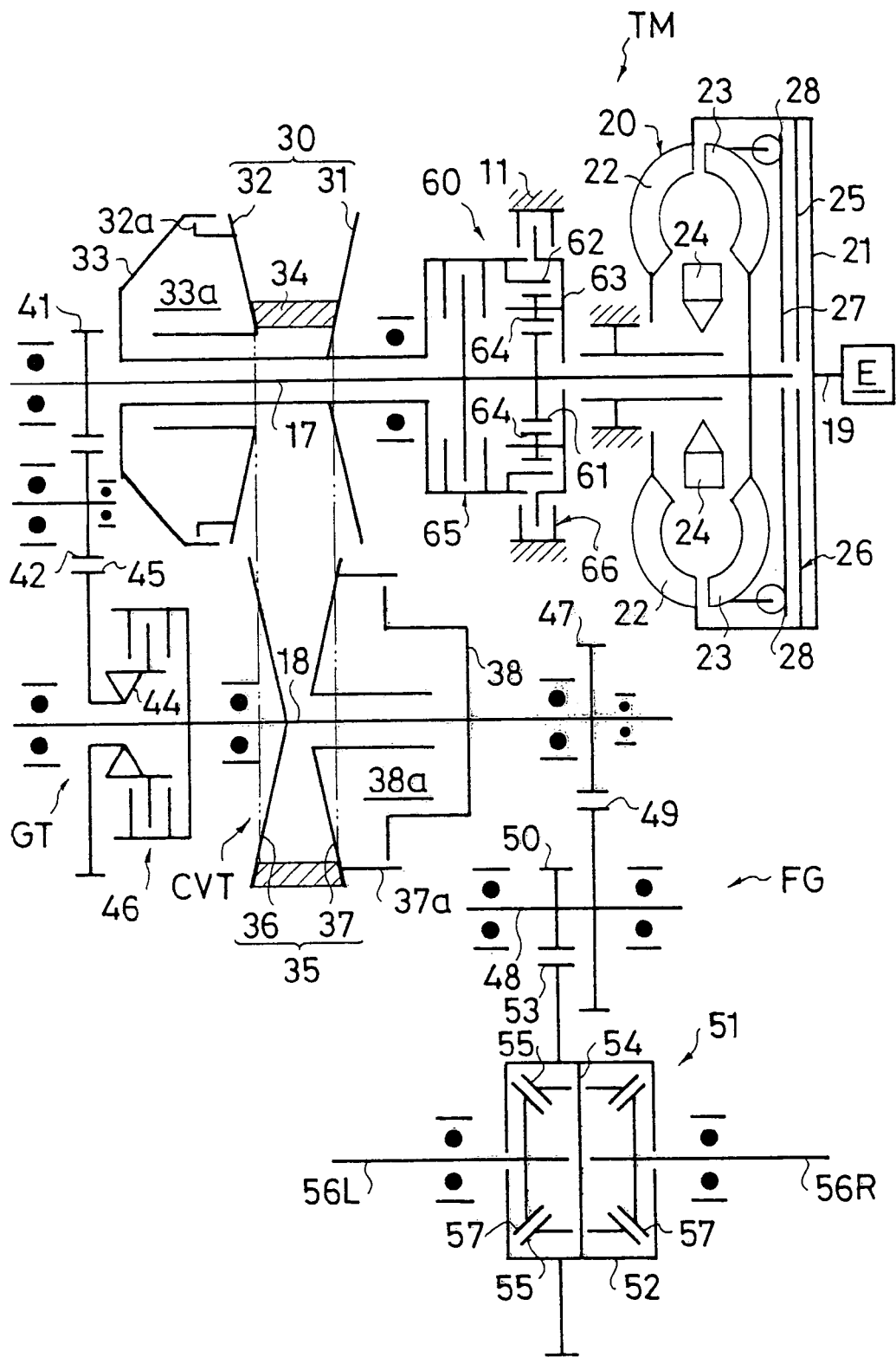
FIG. 2 is a schematic diagram showing the power transmission paths of this transmission.
Figure 3:
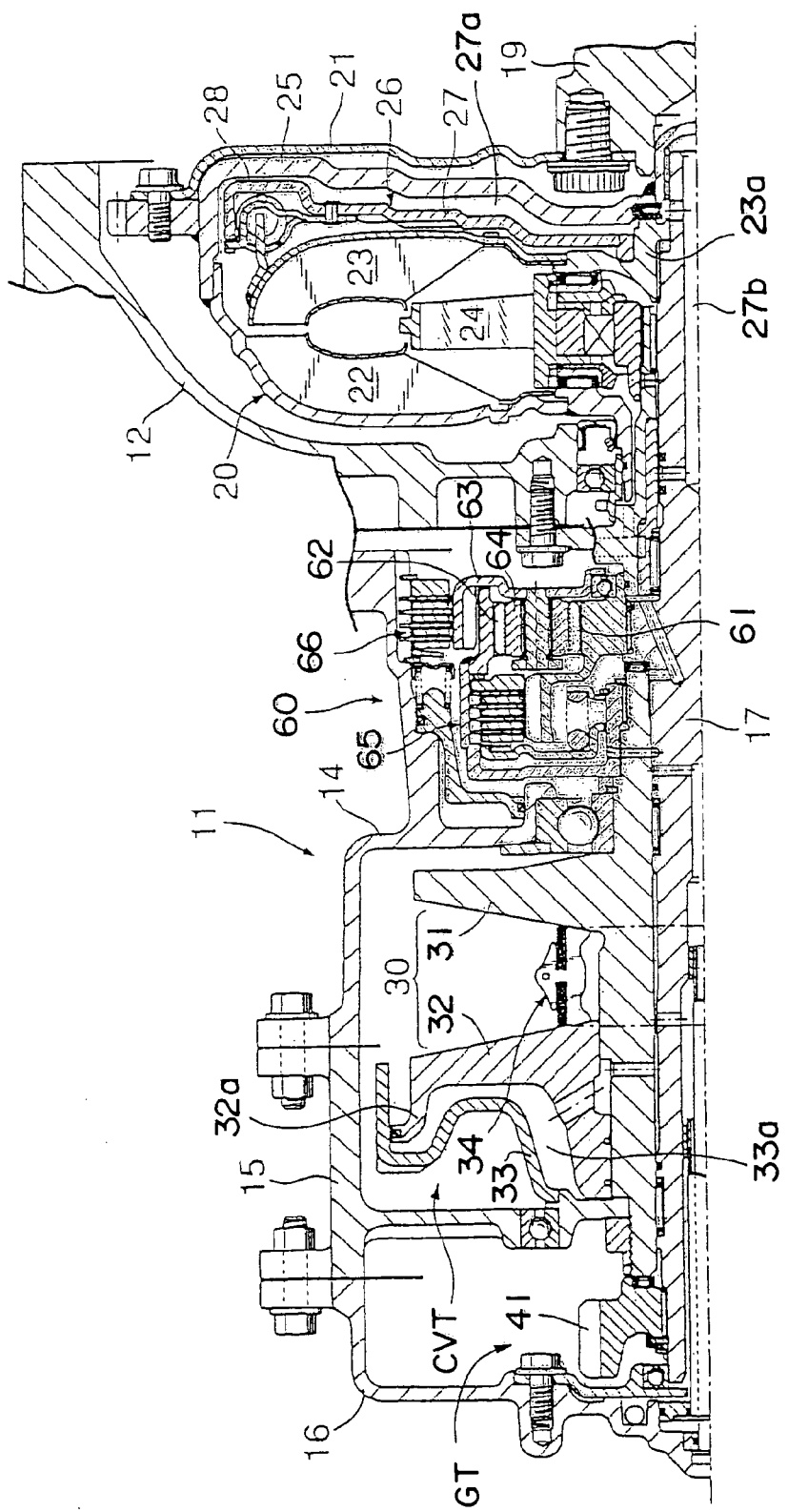
FIG. 3 is an enlarged cross-sectional view showing only the section of the transmission that is located above the center of the main shaft.
Figure 4:
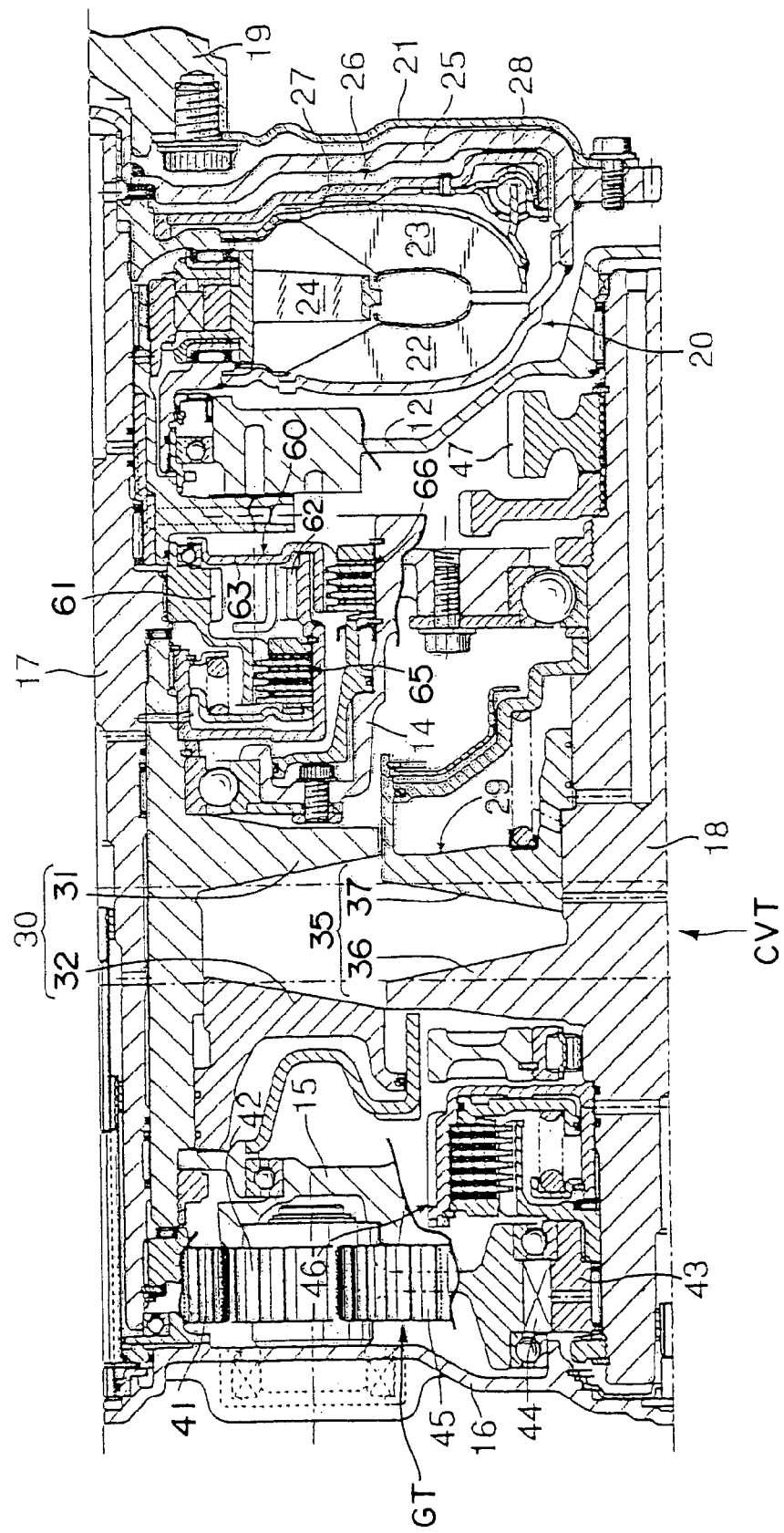
FIG. 4 is another enlarged cross-sectional view showing only the section of the transmission that is located between the center of the main shaft and that of the countershaft.
Figure 5:
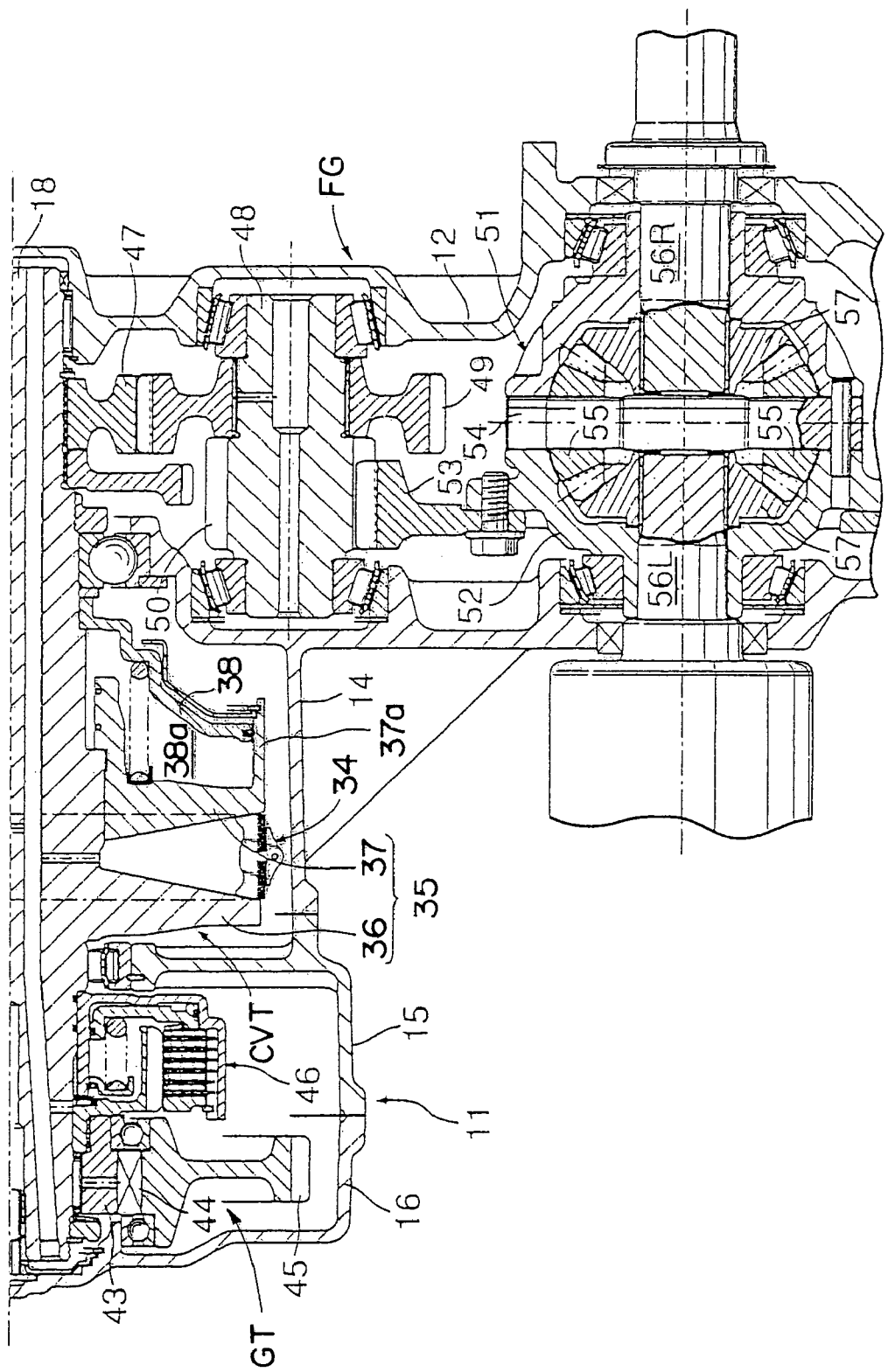
FIG. 5 is an enlarged cross-sectional view showing only the section of the transmission that is located below the center of the countershaft.

Now, a preferred embodiment according to the present invention is described in reference to the drawings. FIG. 1~FIG. 5 show a transmission as a preferred embodiment. FIG. 1 shows the entire construction of the transmission in a cross-sectional view while FIG. 2 shows the construction of the power transmission mechanism of this transmission. FIG. 3~FIG. 5 show in enlargement the sections of the transmission shown in FIG. 1, those sections being located, respectively, above the center S1 of the main shaft 17 of the transmission, between the center S1 of the main shaft 17 and the center S2 of the countershaft 18 of the transmission and below the center S2 of the countershaft 18.

The transmission TM comprises a ratio-change mechanism in a casing 11, which is assembled of a converter case 12, a center case 14, a left case 15 and a cover 16. The main shaft 17 and the countershaft 18, which extend in parallel with each other, are supported rotatably by bearings in the casing 11. A torque converter 20 is provided in the converter case 12, and the right end portion of the main shaft 17 passes through the torque converter 20. The converter case 12 is connected with the housing of the engine, at the side of the housing where the output shaft of the engine is located. The pump impeller 22 of the torque converter 20 is connected through a drive plate 21 to the output shaft (crankshaft) 19 of the engine.

The torque converter 20 comprises a turbine runner 23 and a stator 24 in addition to the above mentioned pump impeller 22. The turbine runner 23 is connected to the end of the main shaft 17 by splines, and the stator 24 is fixed on the casing 11. A lock-up clutch 26 is provided in a side cover 25 which is disposed to surround the turbine runner 23 and is connected to the pump impeller 22. The lock-up clutch 26 is equipped with a disc-like piston 27, which is disposed slidably on the peripheral surface of a boss 23a provided on the turbine runner 23. The peripheral part of the piston 27 is provided and pasted with a friction lining 28, which is to be abutted and engaged frictionally to a wall provided on the side cover 25.

In the lock-up clutch 26, the hydraulic pressure in the internal space of the converter, where the pump impeller 22, the turbine runner 23 and the stator 24 are located, acts to push the piston 27 rightward while the hydraulic pressure in a lock-up oil chamber 27a, which is enclosed by the piston 27 and the side cover 25, acts to push the piston 27 leftward. The lock-up control pressure that is supplied into the lock-up oil chamber 27a through an axial bore provided axially in the main shaft 17 is used to control the abutment of the friction lining 28 of the piston 27 onto the inner wall of the side cover 25, thereby controlling the engagement actuation of the lock-up clutch.

In the transmission, a belt-type continuously variable ratio-change mechanism CVT and a fixed ratio (one ratio) LOW rotational transmission mechanism GT are disposed in parallel with each other to rotationally connect the main shaft 17 and the countershaft 18.

The belt-type continuously variable ratio-change mechanism CVT comprises a drive pulley 30, which is supported by the main shaft 17, a driven pulley 35, which is supported by the countershaft 18, and a metal belt 34, which is disposed around these pulleys 30 and 35. The drive pulley 30 comprises a stationary pulley half 31, which is disposed rotatably on the main shaft 17, and a movable pulley half 32, which is movable closer to and away from the stationary pulley half 31 in the axial direction of the pulley. The driven pulley 35 comprises a stationary pulley half 36, which is fixed on the countershaft 18, and a movable pulley half 37, which is movable closer to and away from the stationary pulley half 36 in the axial direction of the pulley.

A forward/reverse switching mechanism 60, which is a single pinion type planetary gear mechanism, is provided adjacently to the drive pulley 30 on the main shaft 17. The forward/reverse switching mechanism 60 comprises a sun gear 61, a ring gear 62, a carrier 63 and a plurality of planetary gears 64. The sun gear 61 is connected to the main shaft 17, and the ring gear 62, which is connected to the drive pulley 30, is provided away from and surrounding the sun gear 61 and rotatable over the main shaft 17. The carrier 63 is provided rotatably on the main shaft 17, and the planetary gears 64 are supported rotatably by the carrier 63 and mesh with the sun gear 61 and the ring gear 62, simultaneously. The ring gear 62 and the drive pulley 30 together are engageable to and disengageable from the sun gear 61 (and the main shaft 17) through a wet type multi-disc forward clutch 65, and the carrier 63 is also engageable to and disengageable from the casing 11 through a wet type multi-disc reverse brake 66, which is used to hold the carrier 63 stationary.

For driving the vehicle forward, the forward clutch 65 is engaged to connect the sun gear 61, which rotates along with the main shaft 17 as a one-piece body, with the ring gear 62 and the drive pulley 30, so that the drive pulley 30 can rotate together with the main shaft 17 in unison. In this case, the rotation of the main shaft 17 is transmitted directly to the drive pulley 30.

For driving the vehicle rearward, the reverse brake 66 is engaged to hold and fix the carrier 63 against the casing 11, so that the rotation from the sun gear 61, which is connected to the main shaft 17, is reduced and reversed in direction by the planetary gear mechanism before being transmitted to the ring gear 62. In other words, the ring gear 62 is rotated in the opposite direction and at a speed lower than that of the main shaft 17, and this resultant rotation is transmitted to the drive pulley 30, which is connected to the ring gear 62.

While the drive pulley 30 is being driven either forward (i.e., the direction identical to that of the main shaft 17) or rearward (i.e., the direction opposite to that of the main shaft 17), the rotation of the drive pulley 30 is being transmitted to the driven pulley 35 through the metal belt 34. While the rotational power transmission is being carried out by the belt-type continuously variable ratio-change mechanism CVT in this way, the speed change ratio of this mechanism is controlled to vary continuously without any step. This continuously variable ratio-change operation is performed by shifting, respectively, the movable pulley half 32 of the drive pulley 30 and the movable pulley half 37 of the driven pulley 35 axially.

For the shifting of the respective movable pulley halves, the drive pulley 30 is equipped with a drive pulley cylinder 33, which is mounted on a side of the movable pulley half 32. A drive pulley piston portion 32a, which is provided on the side of the movable pulley half 32, is fit slidably in the drive pulley cylinder 33, defining an internal drive pulley oil chamber 33a. Also, a driven pulley piston 38, which is provided facing a side of the movable pulley half 37 of the driven pulley 35, is fit slidably in the driven pulley cylinder 37a, which is provided on the side of the movable pulley half 37, this arrangement defining an internal driven pulley oil chamber 38a. The drive pulley oil chamber 33a and the driven pulley oil chamber 38a are respectively supplied from a hydraulic control valve HV, which is described in detail below, with hydraulic oil to shift axially the movable pulley half 32 of the drive pulley 30 and the movable pulley half 37 of the driven pulley 35, respectively, in the control that changes the speed change ratio of the continuously variable ratio-change mechanism.

The LOW rotational transmission mechanism GT comprises a LOW drive gear 41, a LOW idle gear 42 and a LOW driven gear 45. The LOW drive gear 41 is connected to the main shaft 17 at the left end thereof, and the LOW idle gear 42 is supported rotatably by the casing 11 and meshes with the LOW drive gear 41. The LOW driven gear 45 is provided rotatably at the left end of the countershaft 18 and meshes with the LOW idle gear 42. Specifically, the LOW driven gear 45 is connected to the countershaft 18 through a one-way clutch 44 and a wet-type multi-disc LOW clutch 46, which are provided in series. In this arrangement, the LOW clutch 46 is controlled to engage for the power transmission through the LOW rotational transmission mechanism GT. While the LOW clutch 46 is in engagement, only the rotation to drive the vehicle forward is transmitted from the LOW driven gear 45 to the countershaft 18 because of the effect of the one-way clutch 44.

As described above, the power-transmission paths from the main shaft 17 to the countershaft 18 are established by the forward/reverse switching mechanism 60 and the continuously variable ratio-change mechanism CVT and by the LOW rotational transmission mechanism GT. These two power transmission paths are parallel with each other, and the speed change ratio (gear ratio) R of the LOW rotational transmission mechanism GT is set at a ratio for a speed lower than that at the lowest speed change ratio R(LOW) of the continuously variable ratio-change mechanism CVT.

At the right end of the countershaft 18, connected thereto is a final drive gear 47, which meshes with a first reduction gear 49 fixed on a reduction shaft 48 supported rotatably by the casing 11. Also, a second reduction gear 50, which is a one-piece body with the reduction shaft 48, meshes with a final driven gear 53, which is connected to the differential box 52 of a differential mechanism 51. The differential mechanism 51 is of a known type, and it comprises differential pinions 55 and differential side gears 57. The differential pinions 55 are supported rotatably by a pinion shaft 54 provided in the differential box 52, and the differential side gears 57 are fixed on the right and left axles 56R and 56L, which are inserted in the differential box 52, and they mesh with the differential pinions 55. By this arrangement of gears or this gear train, the rotation of the countershaft 18 is transmitted to the right and left axles 56R and 56L. This rotational transmission mechanism is hereinafter referred to as "final rotational transmission mechanism FG".

Start-Up and Drive Control

Figure 6:
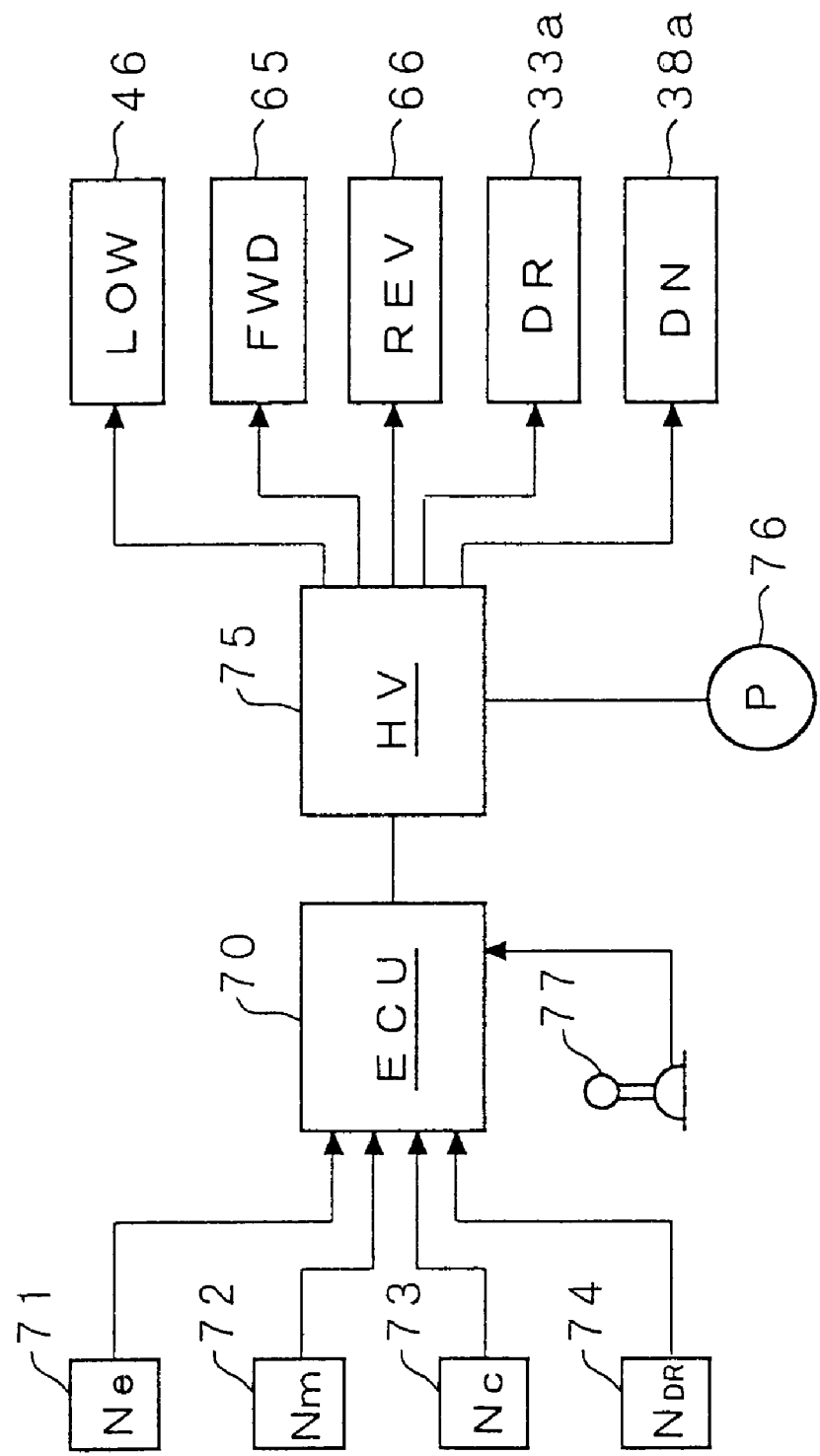
FIG. 6 is a block diagram showing the construction of the control system of the transmission.

Now, the operation, i.e., the start-up and drive control, of the transmission TM, which is constructed as described above, is described in reference to the control system shown in FIG. 6.

At first, the construction of the control system shown in FIG. 6 is described. The control system comprises a hydraulic control valve HV and a control unit ECU. The hydraulic control valve HV adjusts hydraulic pressures and supplies them to the LOW clutch 46, the forward clutch 65, the reverse brake 66, the drive pulley oil chamber 33a and the driven pulley oil chamber 38a of the transmission TM, and the control unit ECU controls the operation of the hydraulic control valve HV. More specifically, the supply of electrical currents to the solenoid valves that constitute the hydraulic control valve HV is controlled by the control unit ECU with control signals sent from the control unit ECU. For controlling the outputs of the control signals, the control unit ECU receives an engine rotation signal Ne from an engine rotation sensor 71, a main shaft rotation signal Nm from a main shaft rotation sensor 72, a countershaft rotation signal Nc from a countershaft rotation sensor 73, a drive pulley rotation signal ND from a drive pulley rotation sensor 74 and a shift position signal Sp and R from a shift position sensor 77. Here, instead of using the countershaft rotation signal Nc, a vehicle speed signal may be used. The shift position sensor 77 detects the position of the shift lever, which is operated at the driver's seat. When the shift lever is operated, for example, to R (reverse range) position, N (neutral) position or D (drive range) position, an R, N or D position signal is sent correspondingly to the control unit ECU in response to the operation of the shift lever.

Neutral Stop Control

At first, the neutral stop control that is executed when the driver operates and sets the shift lever to the N position is described. When the shift lever is set to the N position, the hydraulic pressures being supplied to the LOW clutch 46, the forward clutch 65 and the reverse brake 66 are reduced substantially to zero to release these clutches and brake. Simultaneously, the hydraulic pressures being supplied to the drive pulley oil chamber 33a and the driven pulley oil chamber 38a are controlled to bring the speed change ratio of the continuously variable ratio-change mechanism CVT to a predetermined ratio (for example, a ratio that achieves a lowest speed). In this way, the power transmission is cut off at the forward/reverse switching mechanism 60 and at the LOW clutch 46 of the LOW rotational transmission mechanism GT while the continuously variable ratio-change mechanism CVT is set at the predetermined ratio. As a result, the transmission TM is set in its neutral condition.

Forward Start-Up Control

Now, the forward start-up control of the vehicle is described. This control is executed after the vehicle has come into a halt and when the driver shifts the shift lever from the N (neutral) position to the D (drive range) position. When the shift lever is moved from the N position to the D position, this movement is detected by the shift position sensor 77, and a D position signal is sent to the control unit ECU. The control unit ECU, upon receiving this signal, controls the hydraulic control valve HV to supply the forward clutch 65 with a relatively low pressure, which acts to gradually engage the forward clutch 65 (an engagement-control pressure that is lower than the maximum engagement-control pressure).

As a result, the transmission is set to its in-gear mode, where the rotational driving force of the engine E is transmitted through the torque converter 20, the forward/reverse switching mechanism 60, the continuously variable ratio-change mechanism CVT and the final rotational transmission mechanism FG to the wheels. By the way, the speed change ratio (gear ratio) R(GT) of the LOW rotational transmission mechanism GT is set at a ratio for a speed lower than that at the lowest speed change ratio R(LOW) of the continuously variable ratio-change mechanism CVT. Here, because the forward clutch 65 is brought into engagement gradually with a relatively low pressure, the torque being transmitted to the wheels is small, and the torque transmission is gradual. Therefore, no shock is generated in the transition to the in-gear condition. Moreover, from the point of preventing in-gear shock, it is preferable that the speed change ratio of the continuously variable ratio-change mechanism CVT be set to a predetermined ratio for a speed higher than that at the lowest speed change ratio R(LOW). However, for a smooth transition to a cruise operation that follows this in-gear operation, this predetermined ratio should be a ratio that achieves a speed as low as possible within a range of ratios that are effective for prevention of in-gear shock. In this respect, this predetermined ratio is determined optimally in consideration of characteristics of the vehicle (for example, the vehicle weight) and operational conditions (for example, the temperature of the transmission oil).

After the in-gear operation is initiated by gradually engaging the forward clutch 65, the control unit ECU controls the hydraulic control valve HV to quickly disengage the forward clutch 65 for a transition to the engagement control of the LOW clutch 46. In other words, the forward clutch 65 is used only for initiating an in-gear operation in prevention of any shock, and the real start-up operation is performed by engaging the LOW clutch 46. The timing for the transition from the release of the forward clutch 65 to the engagement of the LOW clutch 46 is predetermined and set with a timer or may be determined from the rotational change of the countershaft 18.

As described above, when the shift lever is operated from the N (neutral) position to the D (drive range) position, at first, the forward clutch 65 is gradually engaged to establish an in-gear condition through the continuously variable ratio-change mechanism CVT whose speed change ratio is set at a ratio for a relatively high speed. Thereafter, a quick transition to the engagement actuation of the LOW clutch 46 is made for a start-up operation. In this way, a so-called "squat control" is performed to achieve a smooth start-up operation by this in-gear operation for prevention of any shock.

After the transition to the engagement control of the LOW clutch 46, the rotational driving force of the engine E is transmitted through the LOW rotational transmission mechanism GT to the wheels at the ratio R(GT) for a lowest speed. Here, if the accelerator pedal is not pressed, then the engine is idling. In this condition, the engagement of the LOW clutch 46 is controlled to transmit a so-called "creep torque" to the wheels. After that, when the accelerator pedal is pressed, the LOW clutch 46 is engaged further to transmit the output of the engine to the wheels at the lowest speed change ratio R(GT) for starting the vehicle.

Forward Drive Control of the Vehicle

After the vehicle is started in the above described way, while the LOW clutch 46 is kept in engagement and as the speed of the vehicle increases, the forward clutch 65 is brought into engagement for a transition to the power transmission through the continuously variable ratio-change mechanism CVT. Here, the speed change ratio of the continuously variable ratio-change mechanism CVT is controlled to change continuously without any step, for example, in correspondence to the accelerator opening and the vehicle speed, in a cruising operation of the vehicle. This shift control is executed, for example, to bring the actual drive pulley rotational speed NDRa to a target drive pulley rotational speed NDRo.

Rearward Start-Up and Drive Control of the Vehicle

On the other hand, the operation for starting and driving the vehicle rearward is performed by controlling the engagement of the reverse brake 66. As mentioned above, when the reverse brake 66 is engaged, the carrier 63 is held stationary. In this condition, the rotation being transmitted from the sun gear 61, which is connected to the main shaft 17, is reduced in the planetary gear mechanism, and the direction of the rotation is reversed there. This resultant rotation is transmitted to the ring gear 62 and to the drive pulley 30, which is connected to the ring gear 62, and the rotational driving force is transmitted through the continuously variable ratio-change mechanism CVT to the final rotational transmission mechanism FG and then to the wheels for starting and driving the vehicle rearward. Here, the lowest speed change ratio R(LOW) of the continuously variable ratio-change mechanism CVT is a ratio for a speed higher than that at the speed change ratio R(GT) of the LOW rotational transmission mechanism GT. However, the rotational speed transmitted from the main shaft 17 to the drive pulley 30 is reduced in the forward/reverse switching mechanism 60 for the reverse drive of the transmission. Therefore, the speed change ratio as a whole for the reverse drive of the transmission is almost equal to the speed change ratio R(GT) of the LOW rotational transmission mechanism GT for the forward start-up, so also during the rearward start-up, a start-up torque equivalent to that of the forward start-up is transmitted to the wheels.

FIG. 7 shows a summary of the control contents for supplying hydraulic pressures to the LOW clutch 46, the forward clutch 65, the reverse brake 66, the drive pulley oil chamber 33*a* and the driven pulley oil chamber 38*a*, respectively, in the forward start-up control, the forward drive control and the rearward start-up and drive control described above. In FIG. 7, mark "○" indicates that an engagement control or hydraulic pressure supply control is executed. A blank space indicates that a release control is executed, and mark "Δ" indicates that a partial engagement control is executed as a squat control.

Another Embodiment

As an another embodiment according to the present invention, the transmission may be equipped with an OD rotational transmission mechanism, whose speed change ratio can achieve a highest speed, in addition to the above described LOW rotational transmission mechanism GT. The speed change ratio R(OD) of the OD rotational transmission mechanism is set at a ratio that achieves a speed higher than that achievable by the speed change ratio R(TOP) of the continuously variable ratio-change mechanism CVT. The transmission is equipped also with an OD clutch whose construction is identical with that of the LOW clutch 46. In this transmission, when the shift lever is operated from the N position to the D position, at first, the OD clutch is gradually brought into engagement. Then, a squat control that releases the OD clutch quickly and brings the forward clutch into engagement is executed to achieve a smooth forward start-up operation without any in-gear shock.

In this transmission, for the start-up operation, the speed change ratio of the continuously variable ratio-change mechanism CVT is set at the speed change ratio R (LOW) for a lowest speed, and the rotational driving force of the engine is transmitted through the continuously variable ratio-change mechanism to the wheels. Thereafter, the speed change ratio is controlled to change continuously without any step in correspondence to the accelerator opening, the vehicle speed and the like. When the speed change ratio of the continuously variable ratio-change mechanism CVT reaches its highest speed change ratio R(TOP), the forward clutch is released, and instead, the OD clutch is brought into engagement for the transmission of the rotational driving force through the OD rotational transmission mechanism.

As described above, a vehicular transmission according to the present invention comprises a continuously variable ratio-change mechanism and a fixed ratio rotational transmission mechanism. It further comprises first frictionally engaging means, which is used for setting a power transmission through the continuously variable ratio-change mechanism, second frictionally engaging means, which is used for setting a power transmission through the fixed ratio rotational transmission mechanism, and engagement-controlling means, which controls the engagement of the first and second frictionally engaging means. With this arrangement, when the transmission is switched from its neutral mode to its in-gear mode, the engagement-controlling means, at first, brings into engagement one of the first and second frictionally engaging means that sets a power transmission through one of the continuously variable ratio-change mechanism and the fixed ratio rotational transmission mechanism whose speed change ratio is set for a higher speed. The engagement-controlling means, then, releases this one of the first and second frictionally engaging means and brings the other one of the first and second frictionally engaging means into engagement (this operation is a so-called squat control). In other words, during the in-gear operation, the power transmission to the wheels is performed through the mechanism whose speed change ratio is set for a higher speed, so that a relatively small torque is transmitted to the wheels. Thereafter, the power transmission is performed through the mechanism whose speed change ratio is set for a lower speed, so that a relatively large torque is transmitted. This procedure results in a smooth in-gear operation and does not generate any shock.

In this vehicular transmission, it is preferable that the speed change ratio of the fixed ratio rotational transmission mechanism be set at a ratio for a speed lower than that at the lowest speed change ratio of the continuously variable ratio-change mechanism. With this arrangement, when the transmission is switched from its neutral mode, where both the first and second frictionally engaging means are released, to its in-gear mode, where the rotational driving force of the drive source is transmitted to the wheels for driving the wheels (i.e., when an in-gear operation is implemented), the engagement-controlling means preferably performs a squat control by engaging the first frictionally engaging means at first, and then, by releasing the first frictionally engaging means and engaging the second frictionally engaging means. In this case, it is preferable that the first frictionally engaging means be controlled to come into engagement while the speed change ratio of the continuously variable ratio-change mechanism is set at a predetermined ratio that is effective for preventing occurrence of in-gear shock (this ratio is determined in correspondence to the characteristics of the vehicle, the temperature of the hydraulic oil and the like).

Also, the speed change ratio of the fixed ratio rotational transmission mechanism may be set at a ratio for a speed higher than that at the highest speed change ratio of the continuously variable ratio-change mechanism. In this case, when the transmission is switched from its neutral mode, where both the first and second frictionally engaging means are released, to its in-gear mode, where the rotational driving force of the drive source is transmitted to the wheels for driving the wheels (i.e., when an in-gear operation is implemented), the engagement-controlling means performs a squat control by engaging the second frictionally engaging means momentarily, releasing this second frictionally engaging means, and then, engaging the first frictionally engaging means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2002-307285 filed on Oct. 22, 2002, which is incorporated herein by reference.

What is claimed is:

1. A vehicular transmission equipped with a continuously variable ratio-change mechanism and a fixed ratio rotational transmission mechanism, which are disposed parallel with each other for transmitting a rotational driving force input from a drive source to wheels;

said transmission comprising:

first frictionally engaging means, which is provided in said continuously variable ratio-change mechanism for setting a power transmission through said continuously variable ratio-change mechanism;

second frictionally engaging means, which is provided in said fixed ratio rotational transmission mechanism for setting a power transmission through said fixed ratio rotational transmission mechanism; and engagement-controlling means, which controls engagement of said first and second frictionally engaging means;

wherein:

when said transmission is switched from a neutral mode, where both said first and second frictionally engaging means are released, to an in-gear mode, where said rotational driving force of said drive source is transmitted to said wheels for driving said wheels, said engagement-controlling means, at first, brings into engagement one of said first and second frictionally engaging means that sets a power transmission through one of said continuously variable ratio-change mechanism and said fixed ratio rotational transmission mechanism whose speed change ratio is set to achieve a higher speed, and said engagement-controlling means, then, releases said one of said first and second frictionally engaging means and brings another of said first and second frictionally engaging means into engagement.

2. The vehicular transmission as set forth in claim 1, wherein:

the speed change ratio of said fixed ratio rotational transmission mechanism is set at a ratio for a speed lower than that at a lowest speed change ratio of said continuously variable ratio-change mechanism; and when said transmission is switched from said neutral mode, where both said first and second frictionally engaging means are released, to said in-gear mode, where said rotational driving force of said drive source is transmitted to said wheels for driving said wheels, said engagement-controlling means, at first, brings said first frictionally engaging means into engagement, and then, releases said first frictionally engaging means and brings said second frictionally engaging means into engagement.

3. The vehicular transmission as set forth in claim 2, wherein:

when said transmission is switched from said neutral mode, where both said first and second frictionally engaging means are released, to said in-gear mode, where said rotational driving force of said drive source is transmitted to said wheels for driving said wheels, said first frictionally engaging means is brought into engagement while the speed change ratio of said continuously variable ratio-change mechanism is set at a predetermined ratio that is effective for preventing occurrence of in-gear shock.

4. The vehicular transmission as set forth in claim 1, wherein:

the speed change ratio of said fixed ratio rotational transmission mechanism is set at a ratio for a speed higher than that at a highest speed change ratio of said continuously variable ratio-change mechanism; and when said transmission is switched from said neutral mode, where both said first and second frictionally engaging means are released, to said in-gear mode, where said rotational driving force of said drive source is transmitted to said wheels for driving said wheels, said engagement-controlling means, at first, brings said second frictionally engaging means into engagement, and then, releases said second frictionally engaging means and brings said first frictionally engaging means into engagement.

* * * * *